United States Patent [19]

Föller et al.

[11] Patent Number: 5,069,247

[45] Date of Patent: Dec. 3, 1991

[54] CONDENSATE DRAIN WITH MONITOR DEVICE

[75] Inventors: Werner Föller, Stuhr; Günter Herbold, Bremen, both of Fed. Rep. of Germany

[73] Assignee: GESTRA Aktiengesellschaft, Bremen, Fed. Rep. of Germany

[21] Appl. No.: 637,168

[22] Filed: Jan. 3, 1991

[30] Foreign Application Priority Data

Jan. 17, 1990 [DE] Fed. Rep. of Germany ....... 4001152

[51] Int. Cl.⁵ .............................................. F16K 37/00
[52] U.S. Cl. ........................................ 137/558; 236/94
[58] Field of Search .......................... 137/558; 236/94; 73/304 R; 340/618, 620

[56] References Cited

U.S. PATENT DOCUMENTS

| | | | |
|---|---|---|---|
| 3,926,368 | 12/1975 | Geer | 236/94 X |
| 4,013,218 | 3/1977 | King | 236/94 X |
| 4,249,697 | 2/1981 | Savage, Jr. | 236/94 |
| 4,630,633 | 12/1986 | Vallery | 137/558 X |
| 4,662,391 | 5/1987 | Tolley | 137/558 X |

Primary Examiner—William E. Tapolcai
Attorney, Agent, or Firm—Collard, Roe & Galgano

[57] ABSTRACT

A condensate drain has a short housing and contains a monitor device which avoids incorrect signals. A testing chamber is located in the housing, laterally adjacent to an entry channel, and therefore upstream of the drain device in the flow direction. A pipe forms the partition in the testing chamber. The condensate drain can be used in all instances where monitoring of its correct operation is required.

12 Claims, 2 Drawing Sheets

CONDENSATE DRAIN WITH MONITOR DEVICE

BACKGROUND OF THE INVENTION

1. Field of the Invention

The invention relates to a condensate drain with a short housing which has a monitor device that avoids incorrect signals.

2. The Prior Art

In such condensate drains, the monitor devices and the drain devices are arranged in a single, common housing. A known version (DE-PS 619,696) has a housing with a relatively long length. In addition, the monitor device tends to give off incorrect signals. In or behind the drain device, there is generally a clear reduction in pressure of the condensate. This causes part of the condensate running off to evaporate, which results in so-called relaxation vapor. In the measurement chamber, the relaxation vapor simulates leakage of vapor and causes a corresponding incorrect signal. Although the condensate drain is actually letting off condensate, the monitor device erroneously signals "vapor loss occurring."

SUMMARY OF THE INVENTION

It is an object of the present invention to provide a condensate drain, the housing of which can be constructed with a short length, and the monitor device of which avoids the aforementioned incorrect signals.

The above object is accomplished in accordance with the present invention by providing a condensate drain comprising a housing having an entry channel and an exit channel; a control chamber connected to the housing; a drain device located in the control chamber, for controlling the flow of condensate; a testing chamber having a bottom base part and having an upper part with a feed opening in its upper part and an outflow opening in its upper part; the testing chamber being arranged laterally adjacent to the entry channel and essentially extending perpendicular to it; a housing bore which forms the feed opening leading from the entry channel into the testing chamber; a guide wall extending downwardly into the testing chamber, which guide wall dividing the testing chamber into a first chamber segment adjacent to the feed opening and a second chamber segment adjacent to the outflow opening, with the first and second chamber segments being connected with each other in the bottom part of the testing chamber; a pipe which extends essentially perpendicular to the entry channel being provided, and which projects from the housing bore into the testing chamber as the guide wall; the outflow opening of the testing chamber being located outside of the pipe; a level sensor having a sensor area which is located in the bottom part of the testing chamber; and a connecting channel extending from the outflow opening of the testing chamber to the control chamber.

Due to the fact that the testing chamber of the monitor device is located laterally next to the entry channel and the fact that the partition consists of a pipe which functions as the feed into the testing chamber, the housing can be constructed with a significantly shorter length than with the known prior art devices. The housing requires only slightly more length than a housing without a testing chamber. No relaxation vapor gets into the testing chamber, since it is in front of the drain device in the flow direction. The incorrect signals as mentioned initially therefore cannot occur.

Preferred embodiments of the testing chamber are those which are particularly advantageous for manufacturing the device. Both the production of the housing bore which extends between the entry channel and the testing chamber, and the installation of the pipe, can be easily and quickly accomplished. In one embodiment, the connector piece of the housing contains the entire testing chamber. A base seals off the connector piece. In a second embodiment, there is merely a short attachment instead of a longer connector piece. This makes the housing particularly compact. Its component part can, therefore, be produced advantageously by being forged, for example. The length of the testing chamber necessary for reliable signal production is created with a hood arranged at the attachment.

In a further embodiment, there is an arrangement of the level sensor that is particularly advantageous for signal production. In another embodiment, the placement of the sensor area of the level sensor is especially advantageous for precise monitoring.

In a further embodiment, a conductive level sensor which forms the sensor area is provided, with a head that is larger than its insulator. It has been shown that such a level sensor provides particularly precise detection. This especially applies also in the transition phase between an exclusively condensate feed and an exclusively vapor feed. In other words even condensate with vapor bubbles can readily flow through the testing chamber.

The inclined position of the testing chamber and the pipe relative to the entry channel permits an even shorter length for the housing. Furthermore, the condensate drain is then suitable both for horizontal condensate lines and for vertical condensate lines. In both installed positions, correct functioning of the monitor device is provided.

The throttle opening according to the invention permits a slight vapor flow in the condensate drain, without causing the monitor device to give off a "vapor loss occurring" signal. This is particularly advantageous when the closed condensate drain is cooling off, because then the vapor in the control chamber condenses and is replaced with vapor that flows in after it. This advantage is provided both for horizontal condensate lines and for vertical condensate lines.

Another embodiment provides that both the testing chamber and the control chamber are located laterally next to the entry or exit channel. Neither of the two is therefore arranged between the inside ends of the two channels, which have the same axis. This results in a particularly short housing length.

BRIEF DESCRIPTION OF THE DRAWINGS

Other objects and features of the present invention will become apparent from the following detailed description considered in connection with the accompanying drawing which discloses two embodiments of the present invention. It should be understood, however, that the drawing is designed for the purpose of illustration only and not as a definition of the limits of the invention.

DETAILED DESCRIPTION OF THE PREFERRED EMBODIMENTS

Figure 1:
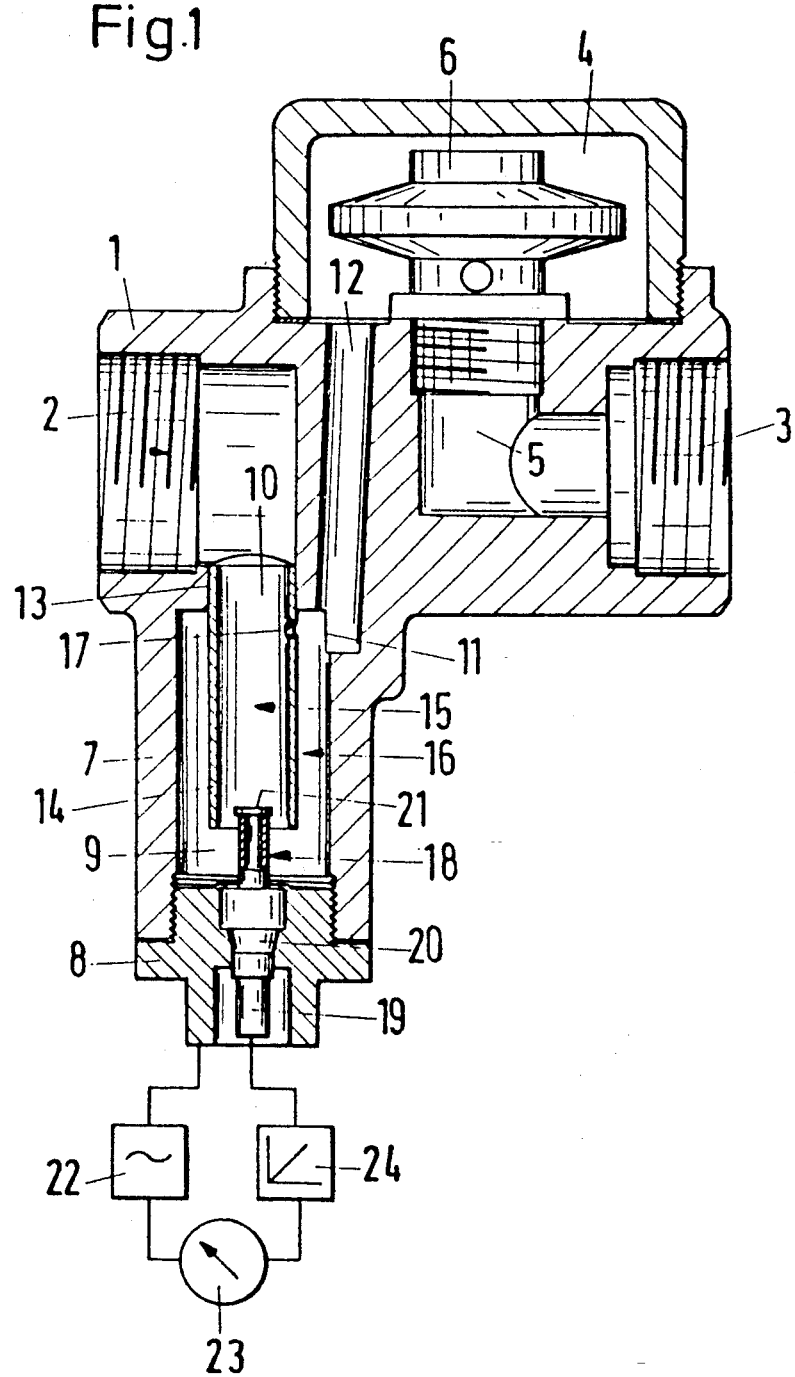
FIG. 1 shows a cross-section view of a condensate drain for a horizontal condensate line.

In FIG. 1, a housing 1 has an entry channel 2 and an exit channel 3, which are coaxial and are arranged along the same axis, as well as a control chamber 4 on the pre-pressure side, which is arranged laterally next to the exit channel 3. A connecting channel 5, on the low-pressure side, extends between the exit channel 3 and the control chamber 4. In the control chamber 4, there is a drain device 6, which allows liquid condensate to flow into the connecting channel 5 and on into the exit channel 3, but prevents vapor from flowing out.

On the side facing away from the control chamber 4, the housing 1 has a connector piece 7, laterally next to the entry channel 2, which extends perpendicularly, and specifically at right angles to the entry channel 2. Connector piece 7 is closed off with a removable base 8 at its bottom, free end. The interior of the connector piece 7 forms a testing chamber 9, which has a central feed opening 10 at the top, and, also at the top has a lateral outflow opening 11. A pre-pressure side connecting channel 12 extends across through the housing 1, between the inside ends of the entry channel 2 and the exit channel 3. Connecting channel 12 connects the outflow opening 11 with the control chamber 4. The feed opening 10 is formed in housing bore 13, which leads from the entry channel 2 into the testing chamber 9. In the testing chamber, a pipe 14 is arranged at right angles to the entry channel 2, extending down from the housing bore 13 and ending at a distance above the base 8.

The pipe 14 divides the testing chamber 9 into a first chamber segment 15 adjacent to the feed opening 10, and a second chamber segment 16 adjacent to the outflow opening 11. Both chamber segments 15 and 16 are connected with each other below the pipe 14. The pipe 14 has a radial throttle opening 17 which is at the same level as is the outflow opening 11, which connects the two chamber segments 15 and 16 with each other at the top portion of each.

A level sensor 18 passes through the base 8; and it projects up into the testing chamber 9 up and into the bottom end of the pipe 14. It has a central, conductive electrode 19 as well as an insulator 20 which surrounds the electrode. In the chamber segment 15, the end of the electrode 19 which is located there projects out of the insulator 20. It holds a thin disk 21 which forms the sensor area and is greater in diameter than the adjacent insulator 20 and electrode 19.

The testing chamber 9, with the pipe 14 and the level sensor 18, acts as a monitor device. It has the objective of determining errors in the operation of the drain device 6, specifically whether there is an outflow of vapor. For this purpose, an electrical power source 22, one or more indicators 23 and an integrator 24, which is located between the indicators 23 and electrode 19, are all connected together in a series circuit to the electrode 19 and the base 8. Thus, the pipe 14 is electrically connected into the circuit by providing a path of electrical conductivity. It should be noted that the integrator 24 is connected in series in front of indicators 23 in a manner capable of measuring the change in resistance taking place between pipe 14 and electrode 19 which is first detected by integrator 24. Only the integrated value measured there is passed on to indicators 23. This makes it possible to determine changes in electrical resistance.

Condensate to be drained enters the chamber segment 15 of the testing chamber 9 from the entry channel 2 through the feed opening 10. It flows down in this segment to the end of the pipe 14, and then reaches the chamber segment 16. From there, the condensate flows out of the testing chamber through the outflow opening 11, into the connecting channel 12 and subsequently into the control chamber 4. The drain device 6 then allows the condensate to flow out of the condensate drain. Both chamber segments 15 and 16 of the testing chamber are filled with condensate while this occurs. Since condensate has a low electrical resistance, there is also a low electrical resistance between the disk 21 of the level sensor 18 and the pipe 14 which surrounds it. This is indicated by means of the indicators 23, as an "error-free operation" signal.

If, on the other hand, the drain device 6 is defective, so that vapor is flowing out of the condensate drain, the condensate is displaced downwards from the chamber segment 15. Vapor is then located between the disk 21 and the pipe 14. Since vapor has a much higher electrical resistance than condensate, a different display occurs on the indicators 23, namely "vapor loss occurring."

If a mixture of condensate and vapor bubbles is flowing through the pipe 14, rather than condensate alone or vapor alone, this is precisely detected by the short disk 21 which functions as the sensor area. In spite of the repeatedly alternating electrical resistance between the disk 21 and the pipe 14, a clear display is provided at the indicators 23, by means of the integrator 24.

If vapor gets into the control chamber 4 while the drain device 6 is intact, the drain device 6 closes and prevents the vapor from flowing into the exit channel 3. When it cools, the amount of vapor located in the control chamber 4 condenses. As a result of the resulting pressure reduction in the control chamber 4, vapor flows into the control chamber 4 from the entry channel 2. However, the amount of vapor is so slight that all of it can flow through the throttle opening 17, which is sized accordingly. The disk 21 continues to be surrounded by condensate. The indicators 23 therefore do not give the incorrect signal "vapor loss occurring," but rather the correct signal "error-free operation."

Figure 2:
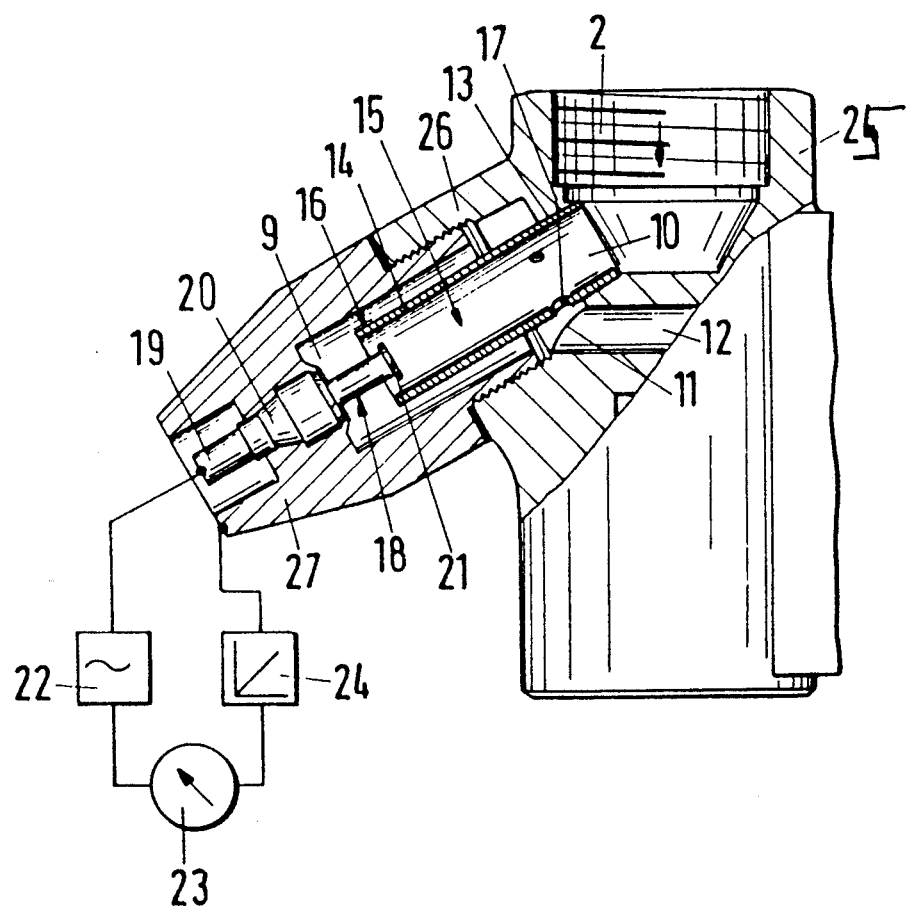
FIG. 2 shows a partial section view of segment of a condensate drain for either a horizontal condensate line or a vertical condensate line.

The housing 25 in FIG. 2 differs from that in FIG. 1 in that it has a relatively short attachment 26 laterally adjacent to the entry channel 2, at the free end of which a hood 27 is arranged. The attachment 26 and the hood 27, together, form the testing chamber 9. The testing chamber 9 and the pipe 14 are arranged obliquely to the entry channel 2, specifically at such an angle that when the condensate line is vertical, the disk 21 of the electrode 19 is located at least partially below the feed opening 10 and the outflow opening 11 of the testing chamber 9. In addition, the pipe 14 is provided with several throttle openings 17 in the vicinity of the outflow opening 11, distributed over the circumference of pipe 14.

The embodiment of the condensate drain shown in FIG. 2 can be used both in horizontal condensate lines and in vertical condensate lines. In both installed positions, the disk 21 of the level sensor 18 is surrounded by condensate unless vapor flows through the condensate drain. A correct display of "error-free operation" is therefore possible in both installed positions.

In addition, because of the throttle openings 17 being arranged over the circumference, it is guaranteed that a slight vapor flow caused by condensation in the control chamber 4 does not erroneously result in the signal "pressure loss occurring." For the remainder of the operating conditions, the description of operation given for FIG. 1 also applies to FIG. 2.

While only a few embodiments of the present invention have been shown and described, it is to be understood that many changes and modifications may be made thereunto without departing from the spirit and scope of the invention as defined in the appended claims.

What is claimed is:

1. A condensate drain comprising:
   a housing having an entry channel and an exit channel;
   a control chamber connected to said housing;
   a drain device located in the control chamber, for controlling the flow of condensate;
   a testing chamber having a bottom base part and having an upper part with a feed opening in said upper part and an outflow opening in said upper part;
   the testing chamber being arranged laterally adjacent to the entry channel and essentially extending perpendicular to it;
   a housing bore which forms the feed opening leading from the entry channel into the testing chamber;
   a guide wall extending downwardly into the testing chamber, which guide wall dividing the testing chamber into a first chamber segment adjacent to the feed opening and a second chamber segment adjacent to the outflow opening, with the first and second chamber segments being connected with each other in the bottom part of the testing chamber;
   a pipe which extends essentially perpendicular to the entry channel being provided, and which projects from the housing bore into the testing chamber as the guide wall;
   said outflow opening of the testing chamber being located outside of the pipe;
   a level sensor having a sensor area which is located in the bottom part of the testing chamber; and
   a connecting channel extending from the outflow opening of the testing chamber to the control chamber.

2. A condensate drain according to claim 1,
   wherein the housing has a lateral connector piece with a free end and which contains the testing chamber; and
   a removable base for said housing for closing off the free end of the lateral connector piece.

3. A condensate drain according to claim 1,
   wherein the housing has a lateral attachment, and said lateral attachment having a free end;
   a hood located at the free end of said lateral attachment, with the hood and the attachment containing the testing chamber.

4. A condensate drain according claim 1,
   wherein the level sensor passes through the base of the testing chamber and projects upwardly into said chamber.

5. A condensate drain according to claim 1,
   wherein the pipe ends at a distance above the base of the testing chamber; and
   wherein the sensor area of the level sensor is located within the pipe.

6. A condensate drain according to claim 1,
   wherein the level sensor has an electrode, said electrode having an end at the test chamber side forming the sensor area and having a part outside of the sensor area;
   an insulator adjacent to and surrounding said electrode part outside the sensor area; and
   the electrode having a head in the sensor area, which projects radially beyond the adjacent insulator.

7. A condensate drain according to claim 6,
   wherein the electrode head is in the form of a disk.

8. A condensate drain according to claim 1,
   further comprising an electrical display device connected to the level sensor, said electrical display device having an integrator and having indicators connected with said integrator.

9. A condensate drain according to claim 1,
   wherein the testing chamber and the pipe are arranged at such an angle to the entry channel that at least part of the sensor area of the level sensor is located below the outflow opening when the entry channel runs in a vertical direction.

10. A condensate drain according to claim 1,
    wherein the pipe has at least one radial throttle opening in its upper part, close to the outflow opening.

11. A condensate drain according to claim 10,
    wherein the pipe has several radial throttle openings distributed around its circumference.

12. A condensate drain according to claim 1,
    wherein the entry channel and the exit channel of the housing are coaxial;
    wherein the control chamber is arranged on the side of the housing facing away from the testing chamber, next to the exit channel; and
    wherein the connecting channel passes through across the housing between the inside ends of the entry channel and exit channel.

* * * * *